United States Patent
Bryant, Jr.

[11] Patent Number: 6,097,173
[45] Date of Patent: Aug. 1, 2000

[54] SOLID BAR BATTERY STRAP ASSEMBLY

[76] Inventor: Olen Winters Bryant, Jr., 5580 Long Walk Dr., Kernersville, N.C. 27284

[21] Appl. No.: 09/408,402

[22] Filed: Sep. 29, 1999

[51] Int. Cl.[7] .................................................. H02J 7/00
[52] U.S. Cl. ............................................ 320/107; 439/627
[58] Field of Search ............................ 320/107; 429/99, 429/100; 439/627, 510

[56] References Cited

U.S. PATENT DOCUMENTS

| | | | |
|---|---|---|---|
| 1,460,604 | 7/1923 | Potter | 439/627 |
| 5,039,929 | 8/1991 | Veistroffer et al. | 320/107 |
| 5,179,503 | 1/1993 | Fouts et al. | 361/729 |
| 5,886,501 | 3/1999 | Marks et al. | 320/107 |
| 6,013,389 | 1/2000 | Nakamaru et al. | 429/94 |

*Primary Examiner*—Shawn Riley
*Assistant Examiner*—Pia Tibbits

[57] ABSTRACT

A solid bar battery connector assembly for connecting and securing a plurality of automotive batteries has two integral solid bar connectors each joining one battery terminal on each of the batteries making up the assembly. Each bar connector has insulation covering that portion of the bar connector extending between connected terminals. Terminal nuts secure the bar connector to the terminals in a tight relationship so that the connected batteries are substantially secured to each other to resist dislodgment from each other and from the vehicle during movement of the vehicle.

18 Claims, 2 Drawing Sheets

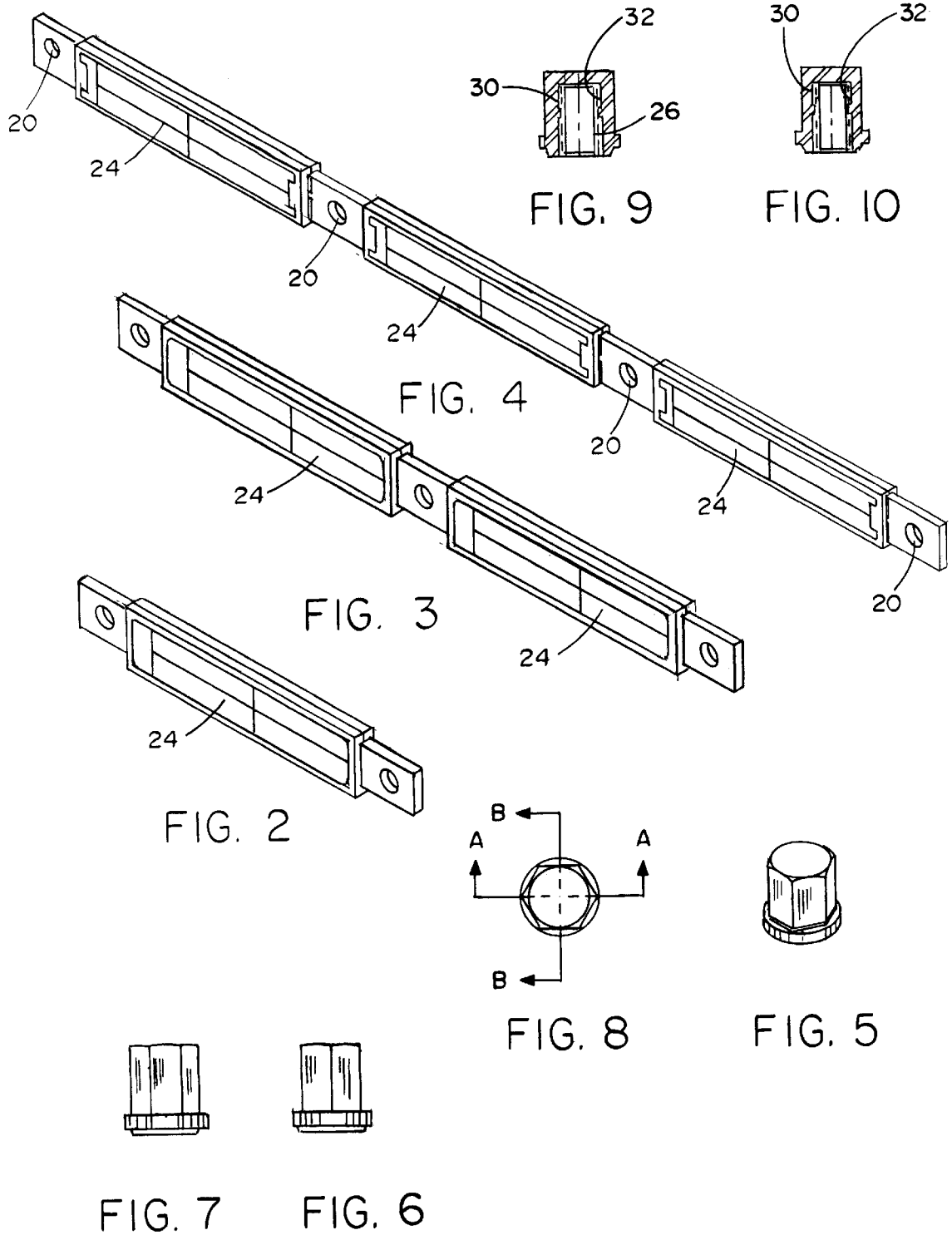

SOLID BAR BATTERY STRAP ASSEMBLY

BACKGROUND OF THE INVENTION

1. Field of the Invention

The present invention relates generally to battery connectors and more particularly to solid bar connectors rigidly securing a plurality of batteries in parallel for operation and stability during movement of the carrying vehicle.

2. Description of Prior Art

Often a plurality of automotive batteries are used in a single vehicle, particularly in heavy trucks and machinery. A plurality of batteries utilized by such vehicles are conventionally connected by a series of cable in parallel; i.e., all of the positive terminals are connected by one or more cables and all of the negative terminals are connected together by one or more terminals. While the electrical operation of such connected batteries is acceptable, the joined assembly can be somewhat loose and even unstable particularly if the vehicle encounters rough terrain and absorbs a series of shocks. Under such circumstances, the batteries can move with respect to each other because of the cable connection and in many instances, if they are not otherwise secured to the vehicle body, they can become dislodged from their mounting bracket and fall to the ground.

Additionally, conventional cable system can be subject to corrosion near the battery terminal since moisture and other foreign substances can find its way under the cable insulation and initiate corrosion ultimately causing current short outs or no flow at all.

A different form of terminal connector is shown in U.S. Pat. No. 3,224,077 wherein a circular engaging clamp is formed by flattening one end of the tubular member, drilling holes in the two ends of the flattened portion and shaping it conform to the round terminal so that it can be pushed downwardly around the terminal and tightened with a screw or by friction. This type of connector is an improvement over cable covered with insulation because of minimizing the corrosion likelihood, however it can be dislodged when the carrying vehicle is jolted and slide upwardly of the terminal and perhaps off the vehicle.

Thus, there is a particular need to develop a battery connector assembly that firmly connect the batteries together in a rigid configuration to avoid corrosion and dislodgment of the battery assembly from the vehicle. It is to that need that the present invention is directed.

OBJECTIVES AND BRIEF SUMMARY OF THE INVENTION

It is the primary objective of the present invention to create a battery connector assembly that has all of the advantages of prior art devices and more and none of the disadvantages.

It is another objective of the present invention is to provide a battery connector assembly that will positively secure and electrically connect in parallel a plurality of batteries and firmly maintain the batteries without movement with respect to each other and with respect to the supporting mechanism of the vehicle carrying them.

Yet another objective of the present invention is to provide a connector bar assembly like that described which will prevent corrosion of terminal connectors and thereby avoid shorts and outages.

Still another objective of the present invention is to provide a batter connector assembled like that described wherein the connectors are insulated between terminals to prevent a short should a wrench or other conductor be accidentally dropped across the connector rods.

Yet still a further objective of the present invention is to provide a connector system that offers better contact with the battery terminals to maximize current flow.

Yet another further objective of the present invention is to provide a connector system that uses less material and therefore is less expensive than conventional systems.

The present assembly include first and second integral and solid bar connectors each joining common terminals of a plurality of batteries wherein apertures in the connectors cooperatively receive the terminals and enable a nut to be threadably placed thereon to hold the connectors firmly in place. Insulation means covers the first and second bar connectors between battery terminals, and terminal nuts are provided to secure the bar connectors to the terminals at each aperture engaging location. At least one of the batteries in the group of batteries has terminals that form jumper lugs to accommodate jumper cable clamps. A jumper lug cover provides protection and insulation for the jumper lug when not being used with jumper cables to further resist an accidental short between the positive and negative terminals of the connected batteries. The bar connectors are substantially rectangular and cross-section with the longer sides of the rectangle being perpendicular to the terminal and having the terminal engaging apertures therein. The shorter sides are parallel to the terminals and thereby provide greater thread contact between the nuts, the threaded terminals and the connector bars.

Thus there has been outlined the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining a principal embodiment of the invention in detail, it is to be understood that the invention is not limited in its application to the details and construction and to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing of other structures, methods and systems for carrying out the several purposes of the invention. It is also to be understood that the Abstract is neither intended to define the invention nor the application, which is measured by its claims, nor to limit the scope in any way.

This summary and these objectives of the invention, along with the various features of novelty characterize the invention, are pointed out with particularity in the claims annexed to and forming a part of this disclosure. For a better understanding of the invention, its operating advantages and the specific objects obtained by its use, reference should be made to the accompanying drawings and descriptive matter in which like characters of reference designate the like parts throughout the several views.

BRIEF DESCRIPTION OF THE DRAWINGS

FIG. 2 is a perspective view of one solid bar connector utilized to join two batteries in parallel;

FIG. 3 is a perspective view of a bar connector utilized to connect three batteries positioned in a side-by-side relationship in parallel;

FIG. 4 is a perspective view of a bar connector utilized to connect four batteries such as illustrated in FIG. 1;

FIG. 5 is a perspective view of a terminal nut threadably securable to a battery terminal to fasten a bar connector to the terminal;

FIG. 6 is a side elevational view of the terminal nut shown in FIG. 5;

FIG. 7 is a side elevational view from another side of the terminal nut shown in FIG. 5;

FIG. 8 is plan view of the terminal nut shown in FIG. 5;

FIG. 9 is sectional and side elevational view of the terminal nut shown in FIG. 7 taken along line A—A in FIG. 8; and FIG. 10 is a sectional and side elevational view of the terminal nut shown in FIG. 6 taken along line B—B in FIG. 8.

DETAILED DESCRIPTION OF THE PREFERRED EMBODIMENT

Figure 1:
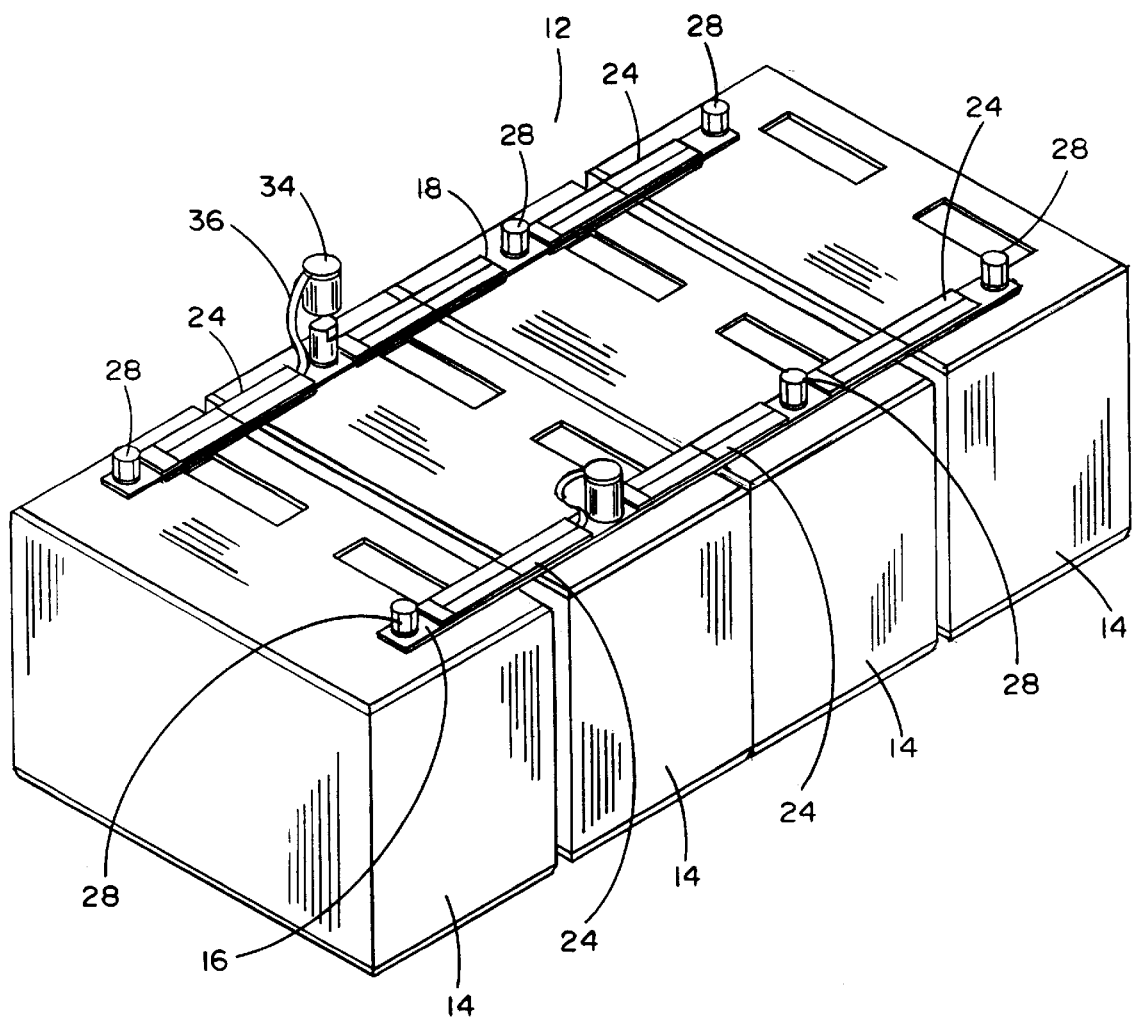
FIG. 1 is a perspective view of the solid bar battery connector assembly comprising the present invention connecting four side-by-side automotive batteries in parallel.

Referring now to the drawings and particularly to FIG. 1, a solid bar battery connector assembly shown generally as 12 provides for the connection in parallel of four automotive batteries suitable for mounting on a large motor vehicle such as a tractor trailer truck. In FIG. 1 four batteries 14 are connected together by the use of a pair of integral solid bar connectors 16, 18 each of which connect the same terminals of all four batteries creating a parallel electrical connection. Connector bars 16, 18 are preferably made of solid copper having a convenient thickness of ⅛ inch and a convenient width of 1 inch. Bars 16, 18 are provided with apertures 20 as shown in FIG. 4 through which terminals 22 extend. Connectors 16, 18 are insulated between terminals 22 by an appropriate insulator 24 which can be shrink plastic tubing, plastic molded onto the connector surface, snap on plastic elements, and heat sealed or chemically sealed plastic material. A suitable material for insulators 24 includes, but is not limited to, polyolefins, nylons and polyvinyl chloride. The purpose of providing insulators 24 is to avoid a short in the batteries in the event a tool or other metallic or conductive object is accidentally laid across or dropped on connectors 16, 18 thus causing a current short out.

Battery terminals conventionally have smooth surfaces and are thus gripped normally by means of a clamping mechanism such as shown in U.S. Pat. No. 3,224,077, particularly in FIG. 6. In the present invention, a terminal nut 28 is provided with an insert 30 formed of brass, aluminum or other suitable material. Battery terminals 22 are exteriorly threaded. Terminal nuts 28 are formed by placing the inserts in a mold and molding material over them. Each insert 30 has interior mateable threads 32 so that terminal nut 28 can be tightened down on terminal 22 and connector rods 16, 18 where terminal 22 extends through an aperture 20. Since the thickness of bar connectors 16, 18 is only about ⅛ inch, a considerable amount of thread contact is achievable when connectors 16, 18 are fastened to terminals 22 by terminal nuts 28 resulting in a better electrical connection and a more secure physical connection.

Jumper lugs 33 are provided as terminals on at least one of the batteries 14 of the battery group to permit a convenient configured location for securing jumper cables in the event another vehicle needs to be started. Each lug 33 is made of solid brass or other suitable material, is larger than terminal 22, and is shaped to conveniently receive a clamp associated with the jumper cables. A jumper lug cover 34 covers each jumper lug 33 when not in jumper cable connection use to prevent corrosion, damage and accidental shorts. Cover 35 is kept in close proximity to its associated lug 33 by a flexible cord or molded strip connecting lug cover 34 with the assembly at a convenient location such as under insulation 24.

A conventional cable system for connecting four batteries in parallel such as shown in FIG. 1 is less effective in holding the batteries in a rigid relationship with each other and with their supporting platform and is susceptible to corrosion and likely to cause current short outs or no current flow. The solid connector system of the present invention weighs approximately 1 lb. less that the conventional cable system and thus saves material, insulation time and provides greater flow efficiency and holding ability.

While the present battery strap assembly is preferably formed from solid copper material, other conductive metals may be used successfully.

FIGS. 2 and 3 illustrate shorter versions of the bar connectors 16, 18 when two batteries or three batteries are used rather than the four batteries used in FIG. 1.

Thus an embodiment of a solid bar battery connector assembly has been illustrated and described in operable form. It is to be realized that optimum dimensional relationships for the parts of the invention to include variations in size, materials, shape, form, function and manner of operation, assembly and use are deemed readily apparent and obvious to one skilled in the art. All equivalent relationships to those illustrated in the drawings and described in this specification are intended to be encompassed herein. The foregoing is considered as illustrative only of the principles of the invention. Numerous modifications and changes will readily occur to those skilled in the art, and it is not desired to limit the invention to the exact construction and operation shown and described. All suitable modifications and equivalents that fall within the scope of the appended claims are deemed within the present inventive concept.

What is claimed is:

1. A solid bar battery strap assembly for connecting the terminals of more than one battery in parallel comprising:
   a first battery terminal-to-battery terminal integral solid bar connector having terminal receiving apertures; a second battery terminal-to-battery terminal solid bar connector having terminal receiving apertures; insulation means covering the first and second bar connectors between battery terminals; and terminal nuts securing the bar connectors to the terminals.

2. The assembly as claimed in claim 1 wherein each of the terminal nuts have an interiorly threaded insert and a plastic cover and a cover secured over and around the insert.

3. The assembly as claimed in claim 2 wherein the bar connectors are substantially rectangular in cross-section with the longer sides being perpendicular to the terminals and the shorter sides being parallel to the terminals and thereby providing greater thread contact.

4. The assembly as claimed in claim 3 wherein the bar connectors are made of copper.

5. The assembly as claimed in claim 4 wherein the insulation means is selected from the group consisting of polyolefins, nylons and polyvinylchlorides.

6. The assembly as claimed in claim 2 wherein the bar connectors are substantially rectangular in cross-section with the longer sides being perpendicular to the terminals and the shorter sides being parallel to the terminals and thereby providing greater thread contact.

7. The assembly as claimed in claim 6 wherein the insulation means is selected from the group consisting of molded plastics, shrink plastic tubing, snap on plastics, heat sealed plastics and chemically sealed plastics.

8. The assembly as claimed in claim 1 wherein the bar connectors are made of copper and have a tin plated covering.

9. The assembly as claimed in claim 1 wherein the insulation means is selected from the group consisting of molded plastics, shrink plastic tubing, snap-on plastics, heat sealed plastics, and chemically sealed plastics.

10. The assembly as claimed in claim 1 wherein the insulation means is selected from the group consisting of polyolefins, nylons, and polyvinylchlorides.

11. The assembly as claimed in claim 1 further comprising:

a jumper nut cover for encompassing each connector joined terminal having an attached relationship with the assembly wherein the bar connectors are substantially rectangular in cross-section with the longer sides being perpendicular to the vertical terminals and the shorter sides being parallel to the vertical terminals and thereby providing greater thread contact, the bar connectors are made of copper and have a tin plated covering, the insulation means is selected from the group consisting of molded plastics, snap on plastics, heat sealed plastics and chemically sealed plastics, and the insulation means is selected from the group consisting of polyolefins, nylons and polyvinylchlorides.

12. The assembly as claimed in claim 11 wherein the longer side dimension is within the range of from $7/8$ of an inch to 1 and $1/8$ of an inch and the shorter side dimension is within the range of from $1/16$ of an inch to $3/16$ of an inch.

13. The assembly as claimed in claim 12 wherein the terminal nut includes a threaded insert fixedly securable on the terminal and a threaded interior threadably engageable with the threaded insert.

14. The assembly as claimed in claim 13 wherein the insert is brass.

15. The assembly as claimed in claim 1 wherein the terminal nut includes a threaded insert fixedly securable on the terminal and a threaded interior threadably engageable with the threaded insert.

16. The assembly as claimed in claim 15 wherein the insert is brass.

17. The assembly as claimed in claim 1 wherein at least one of the batteries has terminals forming jumper lugs.

18. The assembly as claimed in claim 17 further comprising: jumper lug covers moveable attached to the assembly to selective cover the jumper lugs.

\* \* \* \* \*